United States Patent [19]

Collins

[11] 4,060,260
[45] Nov. 29, 1977

[54] SEAT BELT CONTROL SYSTEM

[75] Inventor: Cecil A. Collins, Pontiac, Mich.

[73] Assignee: Robert C. Fisher, West Palm Beach, Fla.

[21] Appl. No.: 686,266

[22] Filed: May 14, 1976

[51] Int. Cl.² .............................................. B60R 21/10
[52] U.S. Cl. .................................... 280/747; 297/388; 297/389
[58] Field of Search .............. 280/747, 744; 180/82 C; 297/388, 389

[56] References Cited

U.S. PATENT DOCUMENTS

| 3,810,657 | 5/1974 | Campbell | 280/747 |
| 3,829,123 | 7/1973 | Holka | 280/747 |
| 3,907,329 | 9/1975 | Erion et al. | 280/747 |

Primary Examiner—Joseph F. Peters, Jr.
Assistant Examiner—Michael J. Forman
Attorney, Agent, or Firm—Harness, Dickey & Pierce

[57] ABSTRACT

The disclosure relates to a seat belt control system for a two-door vehicle having a folding front seat. As the front seat is folded forward, an arm mounted along the side of the back of the seat raises the shoulder strap out of the entrant's way, thus providing unobstructed access to the rear seat of the vehicle.

4 Claims, 6 Drawing Figures

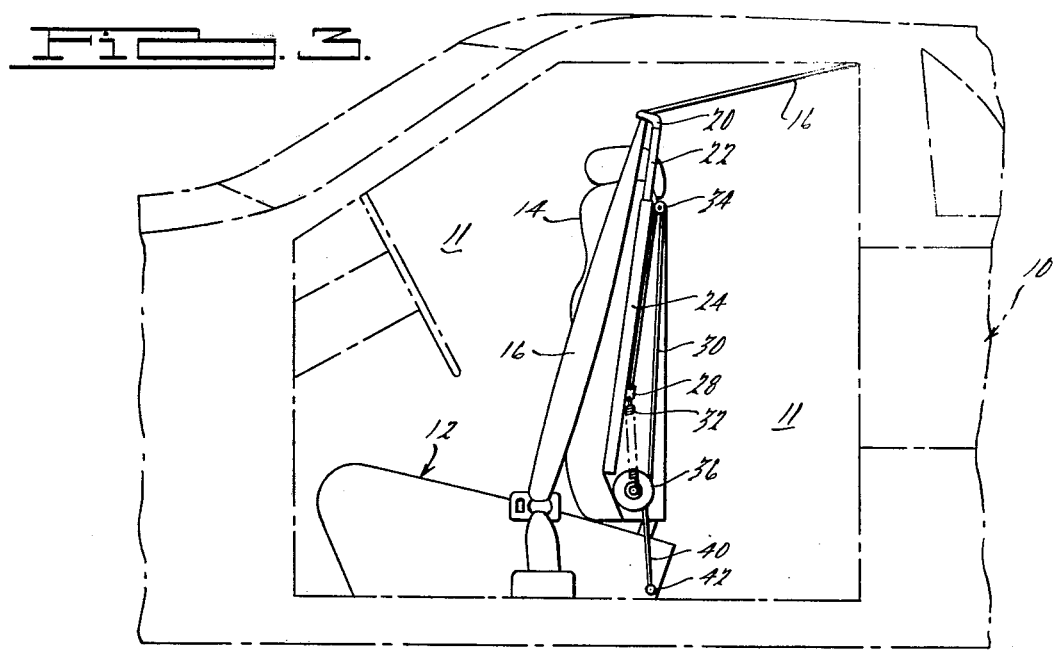
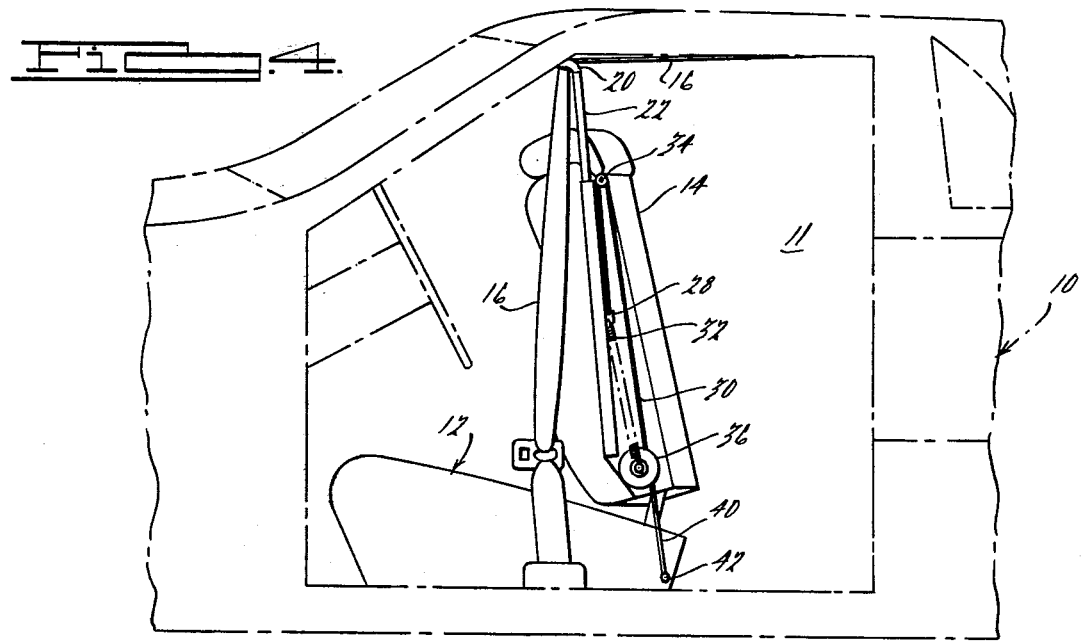
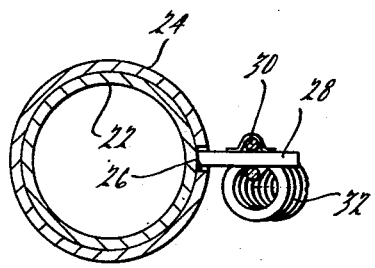
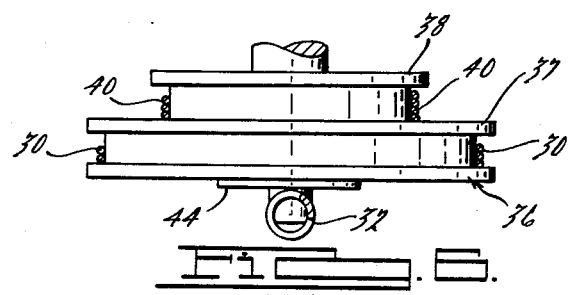

SEAT BELT CONTROL SYSTEM

BACKGROUND — SUMMARY OF THE INVENTION

The Federal Government requires that all passenger vehicles sold in this country be equipped with safety belts and shoulder straps. Typically, automobile manufacturers have combined two units into a single integrated system consisting of a seat belt retractor mounted on the floor of the vehicle adjacent the front seat and a shoulder harness retractor mounted on the ceiling of the vehicle behind the front seat. The shoulder strap extends downwardly from the ceiling retractor through a guide, usually mounted adjacent the head rest at the top corner of the front seat, along the side of the back of the seat, and is fastened to the male tongue of the seat belt buckle. The seat belt which extends from the floor retractor is typically fastened to the same tongue. Thus, after the individual assumes a sitting position in the front seat of the vehicle, both the shoulder strap and seat belt may be properly positioned around the individual by merely drawing the belt buckle across the individual and inserting the tongue into the buckle located on the other side of the seated individual. However, shoulder harness arrangements of of this type can become an inconvenience when attempting to enter the rear seat of a two-door automobile. Specifically, the shoulder strap partially obstructs the entrance to the rear seat when the front seat is folded forward.

It is the object of the present invention to provide a seat belt control system which will alleviate this inconvenience. Generally speaking, the present invention accomplishes this be providing a mechanism which raises the shoulder strap out of the way of a rear seat entrant when the front seat is folded forward. More particularly, the mechanism utilized in the preferred embodiment comprises a pulley arrangement which mechanically multiplies the vertical component of movement of the bottom end of the back of the seat as it is folded forward and applies it to an extension arm which raises the shoulder strap to a point where the strap is closely adjacent and substantially parallel to the ceiling of the vehicle. When the front seat is returned to its normal position, the arm retracts, lowering the shoulder strap to its original position.

Other objects and advantages of the present invention will become apparent from a review of the following detailed description of the preferred embodiment in which reference is made to the following drawings.

BRIEF DESCRIPTION OF THE DRAWINGS

FIG. 3 illustrates the operation of the seat belt control system shown in FIG. 1 as the seat is partially folded forward;

FIG. 4 illustrates the operation of the seat belt control system shown in FIG. 1 after the seat has been completely folded forward;

FIG. 5 is a sectional view of the seat belt control system shown in FIG. 2 taken along section line 5—5; and FIG. 6 is a sectional view of the seat belt control system shown in FIG. 2 taken along section line 6—6.

DETAILED DESCRIPTION OF THE PREFERRED EMBODIMENTS

Figure 1:
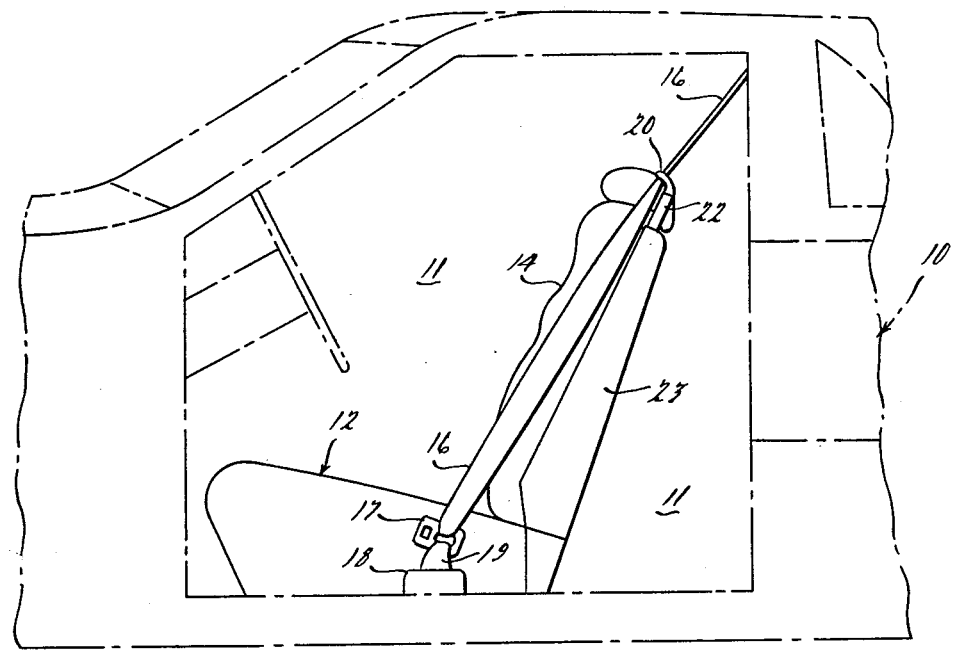
FIG. 1 is a side view of a two-door vehicle having installed therein a seat belt control system embodying the present invention.

Referring to FIG. 1, a phantom view of a vehicle 10 containing a seat belt control system embodying the present invention is shown. The vehicle 10 illustrated is characterized by the single door port 11 which is provided for across to both the front and rear seats of the vehicle 10. The vehicle 10 includes a front seat 12 having a back portion 14 which folds forward to permit entry to the rear seat (not shown). The vehicle 10 is equipped with a standard seat belt and shoulder harness apparatus similar to that previously described. The apparatus includes a floor retractor 18 affixed to the floor of the vehicle 10 adjacent the front seat 12, and a shoulder retractor (not shown) fastened to the ceiling of the vehicle 10 behind the back 14 of the front seat 12. The shoulder strap 16 extends downwardly from the ceiling retractor, through a guide member 20, and along the side of the back 14 of the seat 12. Both the shoulder strap 16 and the seat belt 19 are fastened to the same buckle tongue 17, which, when the strap 16 and seat belt 19 are completely retracted by the floor retractor 18, is located slightly above the floor retractor 18. Affixed to the side of the back 14 of the front seat 12 is a casing 23 which houses the pulley mechanism to be hereinafter described in detail. Protruding from the top of casing 23 is a rod 22 which has fastened thereto at its end guide member 20.

Figure 2:
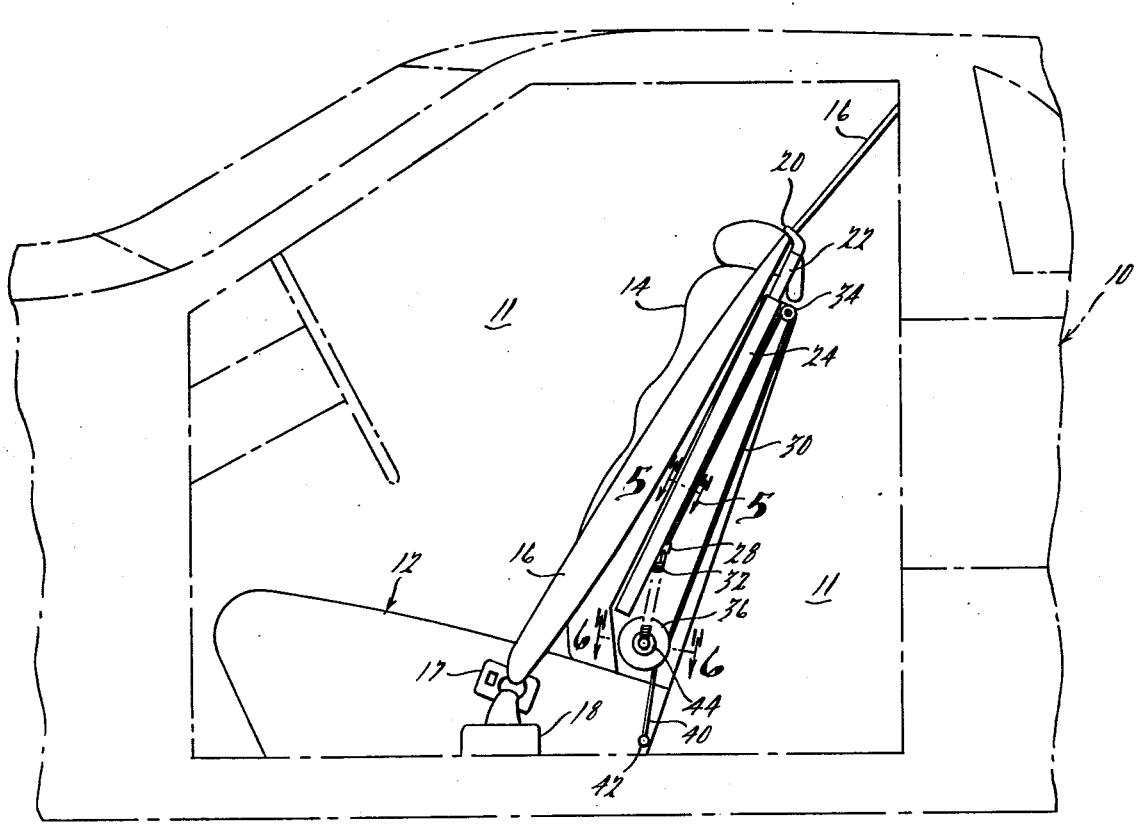
FIG. 2 illustrates a cut-away view of the seat belt control system shown in FIG. 1.

Looking to FIG. 2, the view of vehicle 10, shown in FIG. 1, is illustrated with casing 23 removed to reveal the pulley mechanism. Fastened to the side of the back 14 of seat 12 along substantially its entire height is a generally vertically extending tube 24, which has telescoped therein a rod 22. The inner diameter of tube 24 is slightly larger than the diameter of rod 22 so that rod 22 will freely slide within tube 24. As shown in FIG. 5, tube 24 has formed therein along at least a portion of its length a slot 26. Slot 26 accommodates a small plate 28 which is affixed to rod 22 as shown. Plate 28 has fastened on one side thereof a spring 32 and on the other a pulley cord 30. Cord 30 extends upwardly along tube 24 to pulley wheel 34 where it reverses direction and extends downwardly to pulley wheel 36, fastened to the side of seat 12 at the base of the back 14.

Looking to FIG. 6, a cross-sectional view of pulley wheel 36 is shown. As can readily be seen, pulley wheel 36 actually consists of two concentric wheels 37 and 38 affixed to one another. It will be noted that the diameter of inner wheel 38 is substantially smaller than the diameter of outer wheel 37. This difference in diameter provides the multiplied motion which will be subsequently described in greater detail.

Returning of FIG. 2, another pulley cord 40 is wound around inner wheel 38 and fastened at its opposite end to a stationary point 42 located at the base of seat 12 adjacent the floor of the vehicle 10. Alternatively, this stationary point 42 may, of course, be located directly on the floor of the vehicle 10. Spring 32 which is secured at one end to plate 28 as previously mentioned, has its other end fastened to the hub 44 of the pulley wheel 36. In this manner, spring 32 serves to maintain proper tension of pulley cord 30.

Looking, then, to the sequential drawings, FIGS. 2–4, the operation of the system will be explained. In its initial position, shown in FIG. 2, rod 22 protrudes only a short distance from the top of tube 24 so that guide 20 us substantially flush with the top of the back 14 of seat 12. Referring to FIG. 3, it can be seen that as the back 14 of seat 12 is folded forward, pulley wheel 36 is drawn away from stationary point 42, causing pulley cord 40 to rotate wheel 36 in a clockwise direction. The clockwise rotation of pulley wheel 36 in turn winds pulley cord 30 which raises plate 28 and rod 22 against the bias of spring 32. Of course, guide member 20, mounted on top of rod 22, is raised a corresponding amount. It will be noted, however, that the distance which guide member 20 is raised is substantially greater than the distance pulley wheel 36 is moved from stationary point 42. This is the result of the difference in diameter between inner wheel 38 and outer wheel 37. Specifically, since pulley cord 40 is being drawn off a smaller wheel than on which cord 30 is being wound, and both wheels are being rotated an equivalent amount, outer wheel 37 will accumulate more length of cord 30 than inner wheel 38 will lose of cord 40. The precise amount, of course, will depend upon the exact difference in the diameters of the two wheels.

Finally, in FIG. 4, it can be seen that when the back 14 of seat 12 is folded as far forward as possible, shoulder strap 16 is raised substantially to the top of the door port 11, thus providing unobstructed access to the rear seat of the vehicle 10. When the back 14 of seat 12 is returned to its initial position, the rod 22 is retracted, thereby lowering the shoulder strap 16 to its original level shown in FIG. 2, by the reverse operation of that just described.

It should be noted at this point that the present invention is not limited to the precise mechanical apparatus disclosed herein for coupling the motion of folding the front seat to the raising of the shoulder harness. Rather, various other mechanical apparatuses may be devised to accomplish substantially the same result in substantially the same manner without departing from the teachings of the present invention.

Having thus described my invention what is claimed is:

1. In a vehicle having a seat provided with a back which is foldable forwardly, a door port permitting access to said seat and to the area in rear thereof when said back is folded forwardly, a shoulder strap extending normally from a point behind said foldable back near the top of said vehicle downwardly to the upper corner of said back adjacent to said door port, a guide member having an aperture at the top through which the shoulder strap extends, said guide member having a downwardly extending rod, a tube on said foldable back in which the rod extends, a pair of interconnected pulleys of different diameter mounted near the base of said back, flexible means connecting the pulley of smaller diameter adjacent to the seat, flexible means connecting the pulley of large diameter to said rod whereby when the back is folded forwardly the rotation of the two pulleys due to the one flexible means wound on the pulley of smaller diameter operates the flexible member on the pulley of larger diameter to extend the rod and therefor the guide member a greater distance than would have occurred if the pulleys were of the same diameter.

2. A seat belt control system for a vehicle as recited in claim 1, wherein said flexible means are cables.

3. A seat belt control system for a vehicle as recited in claim 1, wherein spring means are tensioned when the rod is extended by said flexible means for returning the rod and pulleys to their original position when the back is returned to its normal position.

4. A seat belt control system for a vehicle as recited in claim 1, wherein said pulleys of different diameters are mounted secured against relative rotation on a single shaft which is supported at the base of the foldable back, the pulley of smaller diameter being coupled to the input of the mechanism and the pulley of larger diameter being coupled to the output of said mechanism.

* * * * *